Aug. 29, 1967  H. M. LANDIS ET AL  3,339,164
TEMPERATURE SENSOR
Original Filed Oct. 20, 1965  5 Sheets-Sheet 1
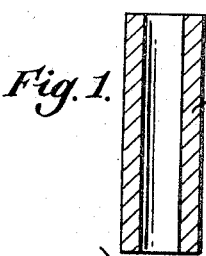
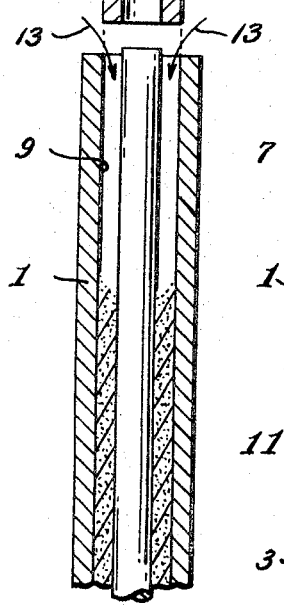
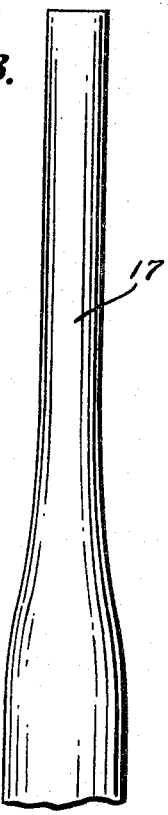
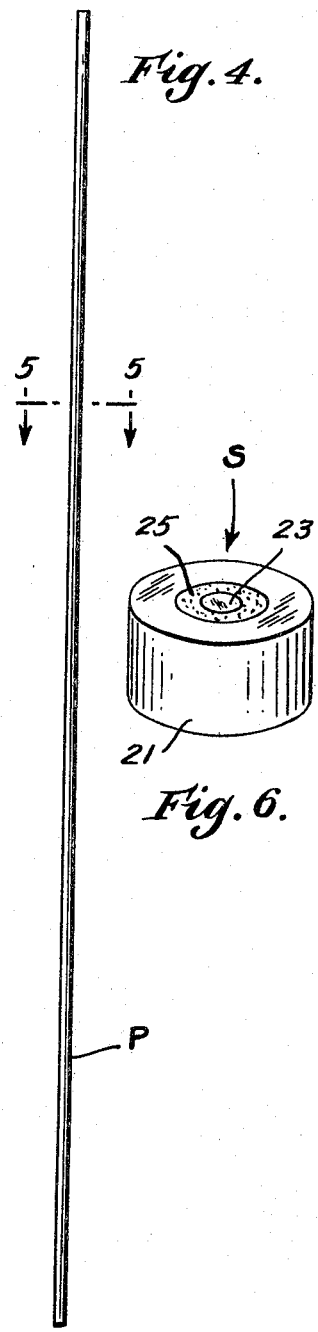
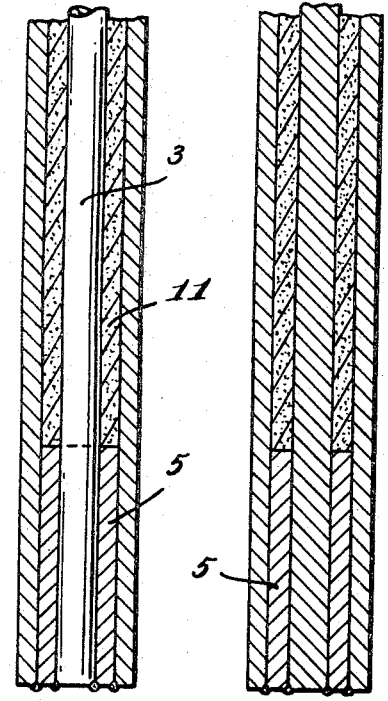
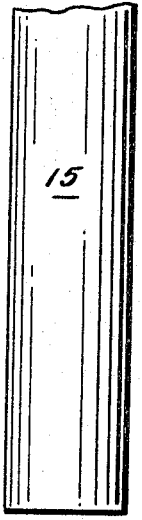

United States Patent Office 3,339,164
Patented Aug. 29, 1967

3,339,164
TEMPERATURE SENSOR
Harry M. Landis, Norton, and Joseph W. Waseleski, Jr., Mansfield, Mass., assignors to Texas Instruments Incorporated, Dallas, Tex., a corporation of Delaware
Original application Oct. 20, 1965, Ser. No. 498,267, now Patent No. 3,295,087. Divided and this application Oct. 3, 1966, Ser. No. 583,908
9 Claims. (Cl. 338—22)

ABSTRACT OF THE DISCLOSURE

This application discloses solid-state NTC sensor products composed of an outer electrode in the form of a shell, inner electrodes in the form of one or more core members and particulate material compressed between electrodes. A solid-phase interatomic bond exists between the surfaces of the electrodes and the particles lying adjacent thereto and between some but not all of the particles. The devices are characterized by exhibiting a repeatable, non-catastrophic breakdown of the resistance at a certain temperature level and the compressed particulate material has a conductivity which is not less than approximately 50% of the theoretical conductivity of the material from which they are formed. The temperature resistivity characteristics of the sensors are variable under a variable applied electric load. The particular embodiments shown include a sensor having a solid central core and an outer sheath with a compressed solid-state sensing material held therebetween. Another embodiment has a central hollow tubular core, an outer sheath and compressed sensing material held therebetween while still another embodiment has a central hollow tubular core with a central rod-like core located within the hollow core and a first compressed sensing material held between the sheath and hollow core and a second compressed sensing material held between the hollow core and the rod-like core. The first and second compressed sensing material in the last mentioned embodiment may be composed of the same or different compositions or compounds. Circuits are disclosed in which the sensors are employed.

---

This application is a divisional application of our U.S. patent application Ser. No. 498,267, filed Oct. 20, 1965 now Patent No. 3,295,087, for Temperature Sensor and is a continuation-in-part of our U.S. patent application Ser. No. 331,712, filed Dec. 19, 1963 now Patent No. 3,266,001, for Temperature Sensors and their Manufacture.

This invention relates to temperature sensors and their manufacture, and with regard to certain more specific features, to solid-state sensors of this type having negative temperature coefficients of resistance (NTC sensors).

Among the several objects of the invention may be noted the provision of low-cost means for the fabrication of strong, stable and compact solid-state NTC sensor products from a variety of starting materials; the provision of such sensors having advantageous physical forms suitable for convenient storage and flexible application and miniaturization in a wide variety of electrical circuits; the provision of sensors of the class described having resistivities which are a function of both temperature and electrical field strength (voltage); the provision of sensors of this class including such as will exhibit noncatastrophic and repeatable so-called breakdown effects in their temperature-resistivity functions; the provision of sensors of the class described having uniform critical characteristics from point to point in their compositions and which may be operated many times without damage to or appreciable change in such uniform characteristics; the provision of improved thermostatic controls employing such sensors; and the provision of sensors which can be made to produce either a single operating signal, or multiple operating signals which may be the same or different. Other objects and features will be in part apparent and in part pointed out hereinafter.

The invention accordingly comprises the products, devices and methods hereinafter described, the materials and combinations of materials, the proportions thereof, steps and sequence of steps, and features of construction, composition and manipulation which will be exemplified in the following description, and the scope of the application of which will be indicated in the following claims.

In the accompanying drawings, in which several of various possible embodiments of the invention are illustrated, FIGS. 1 and 2 are axial sections of parts in arrangements according to certain preliminary steps employed in carrying out the invention;

FIG. 3 is a side elevation illustrating one of repeated reducing steps which are applied to the parts as shown in FIG. 2;

FIG. 4 is a view of an elongate intermediate coilable sensor product according to the invention, after swaging steps have been completed;

FIG. 6 is a perspective view of a typical end product or sensor made according to the invention;

Corresponding reference characters indicate corresponding parts throughout the several views of the drawings.

Figure 7:
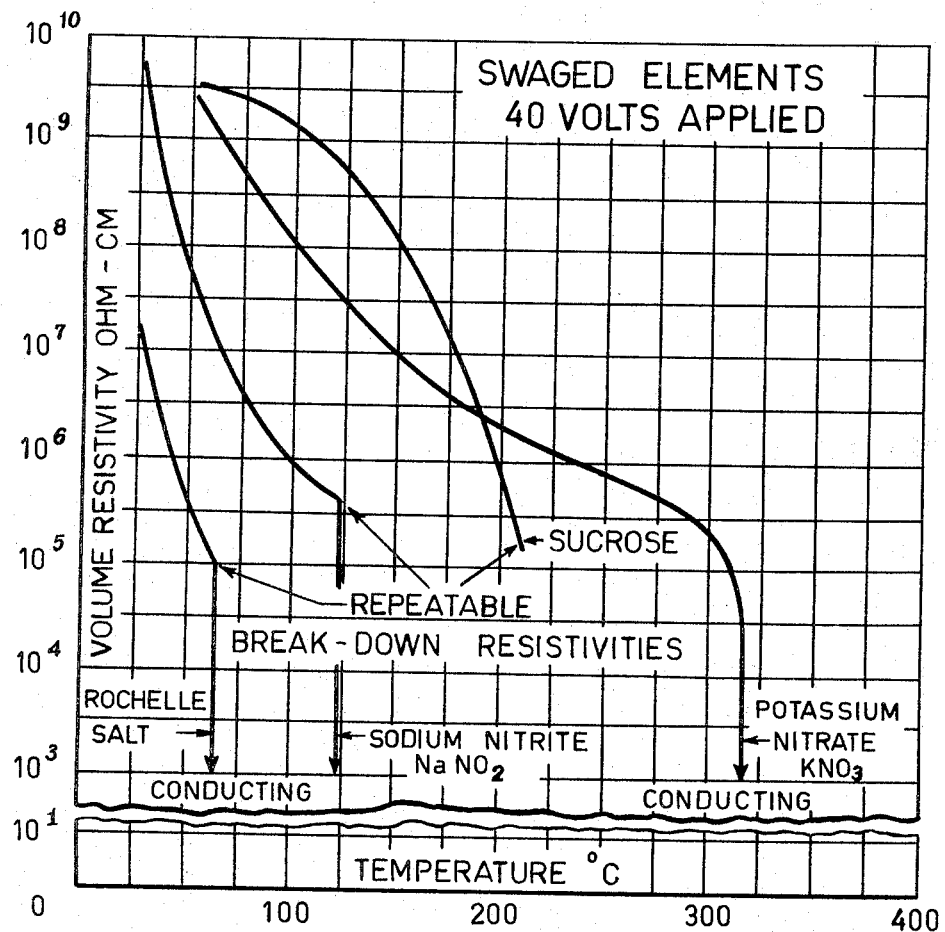
FIGS. 7 and 8 are charts illustrating certain operating characteristics of certain products made according to the invention.

Sensors of the type herein described may be made from members of several large classes of materials, namely:

(1) Inorganic insulators such as $Al_2O_3$, $BaTiO_3$, $NaNO_2$, SiC, $Co_2O_3$, CuO, $Fe_2O_3$, NiO, $V_2O_5$, $SrTiO_3$, $PbTiO_3$, $BaZrO_3$, $KNO_3$, quartz, glasses steatite, Rochelle Salt and the like;

(2) Inorganic semiconductors such as $V_2O_4$ doped with Bi, Sb, etc., doped $BaTiO_3$, Ge, Si, In, Sb, GaAs, and the like;

(3) Crystalline organic insulators such as sucrose, dextrose and the like.

The formula for a typical doped $BaTiO_3$ is $Ba_{.997}La_{.003}TiO_3$. This may exhibit PTC characteristics in some temperature ranges.

Typical glasses are lime glasses, Vycor glass, Pyrex glass IR (infrared). The words Vycor and Pyrex are trademark designations of the Corning Glass Works of Corning, New York. A typical IR glass is a glass having a composition designated $(Si_{1-x-y-z}As_xSe_yTe_z)$.

It is known that single-crystal or bulk specimens of various materials, including those above mentioned, have certain temperature coefficients of resistivity, some of which are exclusively negative and some of which, such as for example, lanthanum-doped $BaTiO_3$, exhibit negative (NTC) characteristics only in certain ranges and positive (PTC) characteristics in other ranges. Most of these materials, such as those indicated in FIGS. 7 and 8 and later to be more fully described, have breakdown resistivities at certain temperatures. Such breakdown resistivities are usually catastrophic in the sense that they are not repeatable and therefore comparatively useless for the objects of the invention.

To make a sensor of single-crystal or bulk materials involves tedious and costly fabricating operations which the present invention avoids. Such single crystal or bulk materials have anisotropic properties, which cannot be put to use unless such bulk crystals or bulk materials are properly oriented with respect to the appropriate electrical connections. This has required tedious and costly procedures to accomplish, such as slow growing or deposition of crystals and costly methods of connecting circuitry thereto.

By means of the present invention, materials such as above listed are reduced to, and then worked more readily in a finely divided state to produce sensors. Ordinarily use of finely divided materials would make the handling of individual particles even more difficult in order to take advantage of their anisotropic properties. By means of the invention such difficulties are completely removed. In addition, unusually compact and strong sensor materials, and sensors combined with terminal contacts, are obtainable by means of the invention.

Another advantage of the invention is that sensors can be made which have resistivity-temperature functions which can be varied by change in the strength of an applied electrical field. This is generally useful whether or not such materials exhibit the so-called breakdown effect but is particularly useful in the cases of those materials that have such breakdown effect. The breakdown effect is one according to which the material in the solid state at a certain temperature suddenly decreases in resistance almost to zero. Whether or not a given material has a breakdown point, its curve of resistivity versus temperature can be shifted by a change in applied voltage. This feature is useful in the field of thermostatic controls, such as will be explained in connection with FIGS. 9 and 10. These show that simple thermostats may be made having repeatable voltage-adjustable trip temperatures.

Sensors, thermostats and other apparatus made according to the invention are cyclically operable many times, even through a breakdown event (when such occurs), with no appreciable damage or change in characteristics.

Tentative theories hypothecated herein concerning why the invention works are given for explanatory purposes and are subject to possible change. It will be understood, however, that the forms and advantages of the invention are independent of any theories which might explain them.

Hereinafter the following are to be taken as equivalents:
(A) Shell, sheath, sleeve, jacket or container;
(B) Core, rod or wire;
(C) Powdered, finely divided or particulate material;
(D) Contacts, terminals or connectors;
(E) Swaging, wire drawing, extruding, tubing, rolling or deforming;
(F) Metals and their alloys.

Referring now more particularly to FIGS. 1–5, there is shown at numeral 1 a cylindrical container, sleeve or sheath composed of a malleable and electrically conductive metal. Spacedly centered within the shell 1 is a core 3 which is in the form of a malleable and electrically conductive rod or wire. At numerals 5 and 7 are cylindrical end plugs composed of any suitable material to effect closure. Members 1, 3, 5 and 7 may in lower temperature applications be composed of stainless steel, copper, silver, aluminum, brass or the like, and for higher temperatures more refractory metals such as nickel, monel, Inconel, molybdenum, tantalum or the like.

As shown in FIG. 1, the end plug 5 has welded or otherwise held within it one end of the core 3 and is itself welded or otherwise held within one end of the shell 1. Plug 7 is initially left out of the sleeve 3 as shown. Both plugs 5 and 7 ultimately provide means for enclosing the annular cylindrical space 9 left between the sheath 1 and core 3 and for substantially centering the core 3.

Prior to the condition shown in FIG. 1, the parts 1, 3, 5 and 7 are cleaned by appropriate conventional pickling in acid baths. The particular pickling procedures depend upon the metals of which the sheath and core are composed. Such are known and require no further description. After pickling, the parts are washed with distilled water and dried, whereupon they are ready for further manipulations. Cleaning of plugs 5 and 7 is elective because these ultimately become part of a minor amount of end scrap.

Before the plug 7 is inserted between the members 1 and 3, finely divided clean material 11 is poured as a filling into the space 9, as indicated by the curved darts 13. The finely divided filling mass is composed of material such as set forth in lists (1), (2) and (3) above (or the like), which has been crushed from the whole crystal or bulk form to a particle size, preferably below substantially 40 mesh (U.S. standard sieve size). This is primarily for convenience in filling and is not otherwise critical. A small amount of material is shown in place at the bottom of FIG. 1. Pouring is continued until a level is reached near the upper ends of the members 1 and 3. The assembly 1, 3, 5 and the infilling 11 are then preferably vibrated to effect greater compaction. Then the plug 7 is inserted and welded in position so as to trap the material 11 between the sheath 1, core 3 and end plugs 5 and 7. The result is an elemental assembly such as shown in FIG. 2, ready for further processing.

As an alternative to pouring the finely divided material 11 into space 9, the material 11 can be made into preformed annular pellets or cylinders which can be inserted into space 9 at darts 13. Thereafter plug 7 can be inserted as above.

Further processing comprises a compressive deformation of the container sheath 1 by a reduction in diameter effected by repeated progressive swaging, wire drawing, extrusion, rolling, tubing or the like, in a manner illustrated in FIG. 3. Assuming that the swaging process is employed, the usual rotary-head swaging machine may be used, employing by successive passes successive 10% reductions to final size, for example. Progressive swaging during a given pass is from one size as shown at 15 to another, reduced, size shown at 17 in FIG. 3. Each successive pass results in a further reduction. A number of passes are employed until a final very small size in much elongated form is reached such as illustrated in FIG. 4. During the reduction, the particles are subject to further crushing and packing action with, it is believed, some preferred crystalline orientation occurring with respect to the sleeve axis. Reduction also occurs in the diameter of the core 3, as well as in the diameter and wall thickness of the sleeve 1. The radial thickness of the mass of material 11 is also reduced.

The reduction is obtained by successive passes for the purpose of obtaining a solid-phase, interatomic bond between the inner surface of the sleeve 1 and the particles lying adjacent thereto; also a solid-phase interatomic bond between the outer surface of the core and the particles lying adjacent thereto; without the need for subsequent sintering or heat treatment to increase the bond, although such after-treatment is not precluded. The stated bonds are mechanically very strong and, in addition, offer low contact resistance. However, interatomic bonding advantageously does not occur between all of the particles themselves. The advantage lies in the fact that the stated breakdown effect is effective between particles and is repeatable instead of merely catastrophic and nonrepeatable. It is believed that this new type of breakdown effect is brought about by ionization of gas along the margins of the crystallites of the particles of the finely divided material. This would not occur if they were all interatomically bonded between themselves, for then the original catastrophic breakdown effects of the basic crystalline or bulk material would prevail. Stated otherwise, if there were interatomic bonding between all the particles, the breakdown effect, as in the original crystals of the particles, would be catastrophic, whereas without such bonding the breakdown effect occurs in a repeatable mode, without doing permanent damage.

The criterion for the amount of reduction from the FIG. 2 to the FIG. 4 form, in order to obtain a stable product having the desired properties such as the repeatable breakdown effect, is a reduction such as will bring about a resistivity in the compacted particulate mass which is not more than approximately 200% of the theoretical resistivity; or stated otherwise, a conductivity which is not less than approximately 50% of the theoretical conductivity of the material in crystalline or bulk form.

Figure 5:
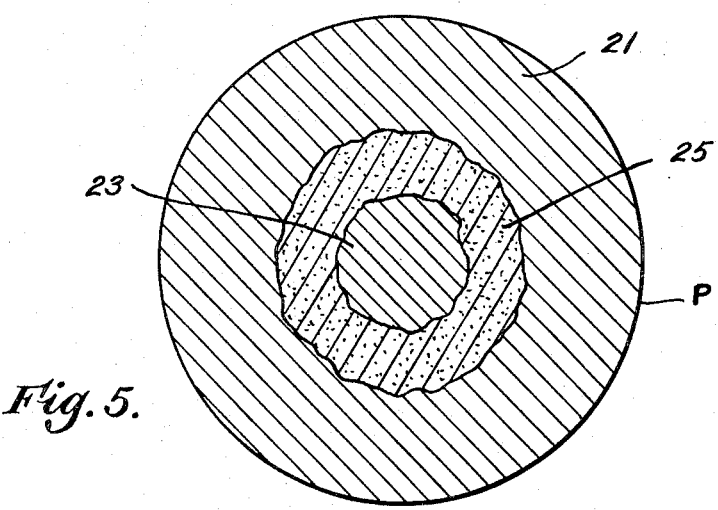
FIG. 5 is a greatly enlarged typical cross section taken on line 5—5 of FIG. 4.

A typical starting dimension for the sheath 1, as illustrated in FIG. 2, may be, for example, 1 inch outside diameter with a wall thickness of the sheath 1 about ⅙ inch, with a diameter of the core 3 about ⅓ inch, leaving about ⅙ inch for the thickness of the annulus of finely divided material 11. The given dimensions are primarily such as will provide in the final product (sensor) an adequate amount of compressed solid-state sensing material as an annulus or sleeve of the same, tightly held between a central core to form one electrical contact, and a surrounding sleeve, ring or band of material to form a second electrical contact. For example, the outside diameter of the sheath 1 at the start of operations may be as high as 2 inches or as small as .090 inch. The progressive reduction operation is repeatedly performed until a product of small diameter is obtained (FIG. 4). For example, starting out as stated with an outside diameter of 1 inch for the sheath 1 (FIG. 2), the final diameter as shown in FIG. 4 may be .020 inch. In the reduction process the length of the assembly shown in FIG. 2 is greatly extended into coilable wire-like form, as illustrated in FIGS. 4 and 5. As above indicated, the repeated progressive squeezing actions bring about solid-state interatomic bonds at the interfaces between the compacted mass of material 9 and the members 1 and 3 but not between all of the crushed particles themselves.

As to the infilling, we have as an example employed finely divided $BaTiO_3$ between a stainless steel sheath of 1 inch outside diameter and a stainless steel core of about ⅓ inch in diameter (FIG. 2). In another case we started with a copper sheath of 1 inch outside diameter and a copper core 3 of about ⅓ inch in diameter, with an infilling of $Al_2O_3$. In each of these cases the final outside diameter was .020 inch. We have also started with a copper sheath 1 of .090 inch outside diameter having a wall thickness of .022 inch and a copper core diameter of .022 inch, the whole swaged down to .050 inch. A typical finished cross section of an intermediate continuous product P like that of FIG. 4 is shown very greatly enlarged in FIG. 5. Its concentricity is very satisfactory.

From the intermediate product of FIG. 4, the final product in the form of the desired sensor is produced by division (shearing, sawing or the like). A typical resulting form is shown at S in FIG. 6. This comprises in final form an outer ring or sleeve providing an outer conductive contact or terminal 21, an inner core in final form providing an inner conductive contact or terminal 23, and an annular intermediate ring 25 which has the characteristics of the improved sensor material. The length of the sensor S is determined by the total resistance desired to be obtained therefrom when connected in an electric circuit through the terminals 21 and 23. The total resistance of the sensor S is a function of its length as cut from the intermediate product P. It will be apparent that the product P can be calibrated in terms of resistance per unit of length. Hence sensor resistances are predictable in terms of their lengths, which is a convenience in designing apparatus employing them. Another advantage of the form of the indefinitely long intermediate product of FIG. 4 is that it may readily be coiled for storage prior to segmentation.

Since the means of fabrication bring about intimate electrical contact under pressure between the circular terminals 21 and 23 of each sensor S and the intermediate sensor material 25, there results also extremely good mechanical and thermal stability of the sensor as a whole (FIG. 6). An unexpected phenomenon in the case of lanthanum-doped $BaTiO_3$ when used for the sensor material 25 is that any original PTC characteristic that it may originally have had in certain temperature ranges is converted to an NTC characteristic. Other NTC materials in the above list, which normally have their NTC properties degraded when in particulate form (as when crushed), have these NTC properties reinstated when subjected to the swaging operations herein described. This is a great advantage because the manufacture by use of particulate materials is much less time-consuming and costly than with bulk masses or crystals of the same.

Following is a table showing the percentage change of resistance per ° C. change in temperature in valid ranges prior to breakdown for sensors employing, for example the various filler materials indicated:

TABLE

| Substances | Percent Change of Resistance per ° C. Change of Temperature | Valid Range, ° C. |
|---|---|---|
| Titanates: | | |
| $BaTiO_3$ | 1.6 | 100–600 |
| $SrTiO_3$ | 2.4 | 100–600 |
| $PbTiO_3$ | 1.6 | 100–600 |
| Ceramic (High Temp.): | | |
| Steatite | 1.9 | 300–850 |
| $Al_2O_3$ | 0.5 | 100–600 |
| $BaZrO_3$ | 0.4 | 200–500 |
| SiC | 0.2 | 100–700 |
| Glasses: | | |
| Vycor | 3.6 | 100–200 |
|  | 3.1 | 300–400 |
|  | 2.1 | 200–300 |
| Pyrex | 2.9 | 200–300 |
|  | 1.5 | 500–600 |
| Lime Glass | 2.9 | 200–300 |
|  | 1.5 | 350–500 |
| Low Temp. Group: | | |
| Rochelle Salt | 12.5 | 25–65 |
| $NaNO_2$ (Sodium Nitrite) | 20.2 | 25–50 |
|  | 5.7 | 75–125 |
| $KNO_3$ (Potassium Nitrate) | 5.2 | 50–150 |
|  | 2.2 | 200–300 |
| Sucrose | 3.5 | 50–150 |
|  | 14.6 | 150–200 |

Figure 8:
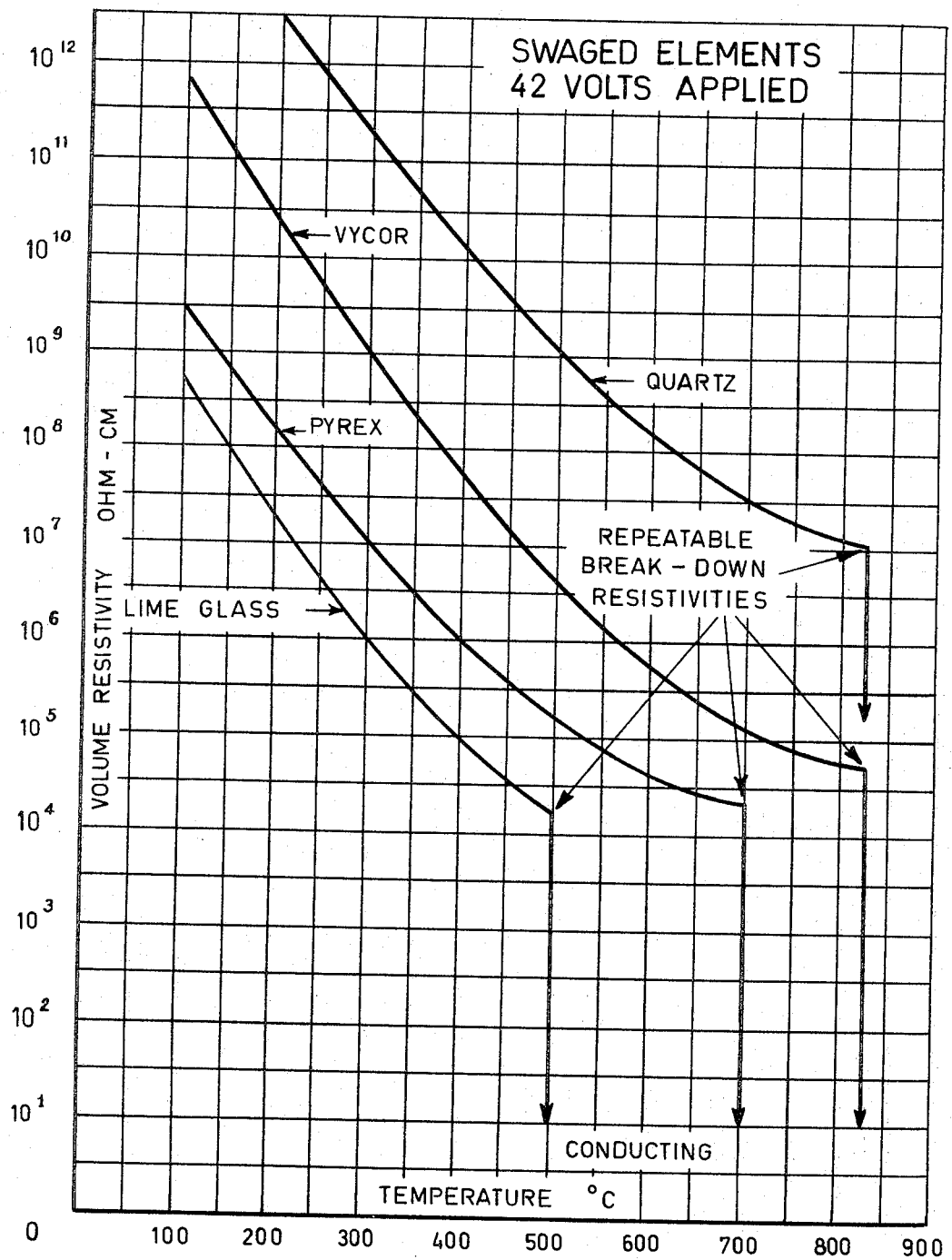

FIG. 7 is a chart showing how one group of materials mentioned in the table have their resistivities related to temperature when incorporated in material such as shown in FIG. 4 or a sensor like the one shown in FIG. 6. This is under conditions of the application of a 40 v. electric field. FIG. 8 is a chart showing how quartz and the glasses mentioned in the table have their resistivities related to temperature when incorporated in material such as shown in FIG. 4 or a sensor like the one shown in FIG. 6. This is under conditions of the application of a 42 v. electric field. It will be understood that if the applied voltages indicated in FIGS. 7 and 8 were to be increased, the curves shown would all shift to the left and vice versa. As a result, sensors made of materials having breakdown properties, when used in a suitable circuit to form a thermostat, may have the breakdown effect occur at any desired temperature (within an appropriate range), said temperature adapted to be changed by changing the electric field strength (voltage) across the inner and outer contacts such as 21 and 23 in FIG. 6.

The applied voltages indicated in FIGS. 7 and 8 are arbitrary. When other voltages are applied, the breakdown effects will occur at other temperatures. It will be appreciated that the breakdown effect when present is a property of the material in its original crystal or bulk form, but that in such form the breakdown occurs catastrophically, regardless of the temperature at which this occurs. On the other hand, in the compressed particulate form herein described, the temperature at which the breakdown occurs again depends upon the voltage applied, but it becomes repeatable. It may also be remarked that advantageously the breakdown temperature in the compressed particulate form is less than the breakdown temperature in the crystalline form at a given voltage. As a result, catastrophic breakdown at the higher temperature is foreclosed.

Figure 9:
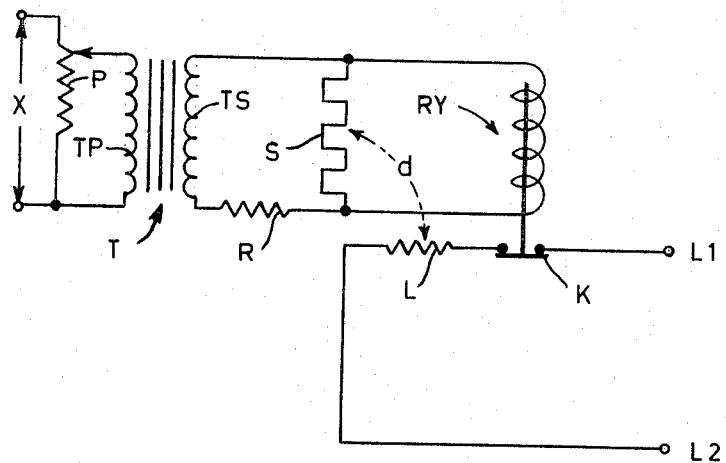
FIGS. 9 and 10 are schematic circuit diagrams of two exemplary embodiments of thermostatic control apparatus of the present invention.

FIG. 9 illustrates novel thermostatic control apparatus incorporating as a component in an electrical circuit a sensor S of the present invention. This circuit includes a transformer T having a primary winding TP and a secondary windings TS. Transformer T, and a potentiometer P connected across an A.C. voltage source X, constitute an adjustable electrical potential source for this electrical circuit. Primary winding TP is connected across the movable and one fixed contact of potentiometer P. This circuit further includes a sensor S, series-connected with a current-limiting resistor R across secondary winding TS, and the coil of a relay RY shunt-connected across sensor S.

A second electrical circuit including normally open contacts K of relay RY is provided for electrically energizing a load L from an electrical power source L1, L2. Load L may be any electrically energized means varying the temperature of a body, the temperature of which is to be controlled. For example, L could be an electrically controlled furnace, an electrically controlled refrigeration system, or an electrical motor that is to be protected against overheating, etc. The load, or the portion of the load which is to have its temperature sensed, is positioned in heat-exchange relationship with sensor S as indicated by the curved dart D. This relay RY is commonly connected in both electrical circuits, receiving its control stimulus from the first circuit including sensor S and changing the conductivity of the second electrical circuit including load L from a conducting to a nonconducting mode or state in response to a particular change in the resistance of sensor S.

Operation is as follows (FIG. 9):

Assuming L to be an electrical motor that is to be protected from overheating, and that 125° C. is selected as the maximum permissible temperature, then a sensor S is employed which has a resistance that will change sharply at a temperature in the order of 125° C., e.g., a sensor of this invention with compressed particulate sodium nitrite. The magnitude of the electric field across sensor S is adjusted by varying the setting of the movable contact of potentiometer P until the resistance of sensor S sharply decreases at 125° C. from a relatively high value (e.g., in the order of several thousand ohms at sensor temperatures less than 125° C.) to a relatively low value (e.g., on the order of an ohm or less). If the temperature at which the resistance of S sharply decreases is below 125° C., the electric field is decreased by adjusting the movable contact of potentiometer P to apply a higher potential across S, and conversely if the trip temperature of S exceeds 125° C., then the electric field is increased appropriately.

After initial calibration or adjustment of the temperature at which the resistance of R sharply decreases is accomplished by proper adjustment of the electric field, the voltage drop across the high resistance of S (at temperatures below 125° C.) energizes the coil of relay R, thus closing contacts K and energizing the load L from power source L1, L2. The load circuit continues to remain energized until the temperature sensed by S exceeds 125° C., whereupon the resistance of sensor S sharply decreases, thereby reducing the voltage applied to the coil of relay R to a level below its drop-out value. This deactuation of relay R opens contacts K and thus the load circuit is deenergized, preventing overheating of the motor. The resistance of R serves to limit the current flow through the sensor S and secondary TS. It will be understood that a D.C. electrical potential source may be used (e.g., a battery and potentiometer) as the equivalent of the A.C. electrical potential source shown in this embodiment of FIG. 9.

Figure 10:
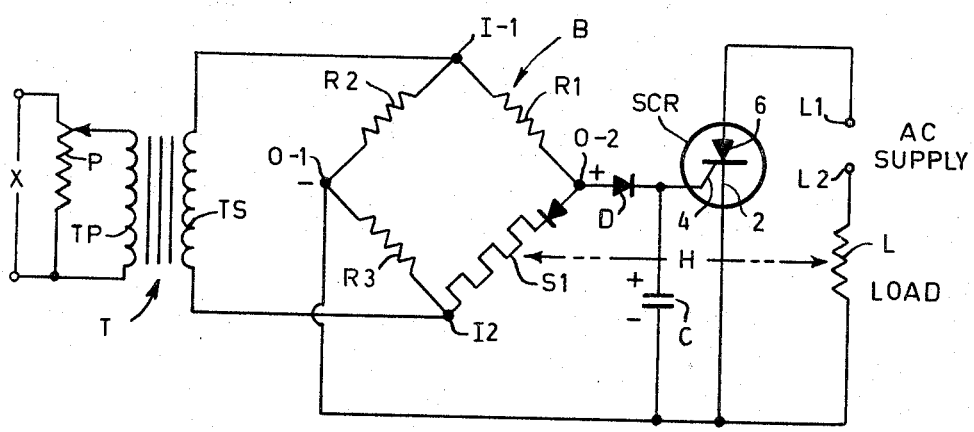

The FIG. 10 embodiment differs from that of FIG. 9 in that the first electrical circuit includes a resistance bridge B, a pair of diodes D and D1 and a capacitor C. A silicon-controlled rectifier SCR is employed in place of relay RY. A sensor S1 of the present invention, having a relatively steep temperature-resistance relationship and which does not exhibit a sharp change in resistance within the temperature range to be sensed, is utilized in place of the sensor S. The adjustable electrical potential developed across secondary TS is applied across input terminals I-1 and I-2 of the bridge 3, the legs of which respectively comprise resistances R1, R2 and R3, the fourth leg including an optional reverse current blocking and protective diode D1 serially connected with sensor S1. Bridge output terminal O-1 is connected to cathode electrode 2 of silicon-controlled rectifier SCR while output terminal O-2 is interconnected through a rectifying diode D2 to gate electrode 4 of SCR. Capacitor C is shunt-connected across the gate-cathode circuit of SCR.

A second electrical circuit is provided for electrically energizing load L from the A.C. power source L1, L2. Serially connected in this circuit with the power source or supply and load L is the power-carrying circuit of rectifier SCR which includes its anode 4, electrode 6 and cathode 2. Thus the SCR is commonly connected in both electrical circuits, receiving its control stimulus from the first circuit including the sensor S and changing the conductivity of the second electrical circuit including the load L from a conducting to a nonconducting mode or state in response to a particular change in the resistance of sensor S. The dotted dart H indicates a heat-exchange relation between L and S1.

Operation is as follows (FIG. 10):

The parameters of R1, R2, R3 and S1 are so selected that when an electric field with a preselected magnitude (less than the value of the potential applied across bridge input terminals I-1 and I-2) is applied across sensor S, its resistance at a predetermined temperature relative to the ohmic values of R1, R2 and R3 will provide a D.C. potential (measured across the gate-cathode circuit of rectifier SCR) which is slightly less than the switching or turn-on potential for the particular type silicon-controlled rectifier employed. Assume the load L in this instance to be an oven or furnace unit with sensor S in heat exchange with the space to be heated and the electric heating element, solenoid-actuated gas valve, etc. The load is connected in the anode-cathode circuit of SCR. The bridge will be substantially balanced at the predetermined temperature of the oven. At temperatures below the predetermined temperature the resistance of S1 is relatively greater and the bridge will be unbalanced as the voltage drop across S1 is greater than across R1, thereby developing a D.C. potential across the bridge output terminals O-1, O-2, the polarity of the latter being positive relative to O-1. Thus, the SCR will continue to conduct during every half-cycle of the A.C. supply, thereby continuing to energize load L. As the temperature sensed by S1 rises to the predetermined level, the resistance of sensor S1 and thus the voltage drop thereacross decreases until the bridge is substantially balanced and the D.C. potential across O-1, O-2 is insufficient to maintain rectifier SCR conducting. As the temperature sensed decreases, the voltage across S1 increases as its resistance increases until the gate-cathode signal applied to it by the bridge again triggers the SCR. Thus, the temperature of the load L may be maintained substantially constant at the predetermined temperature. To adjust the predetermined temperature to another preselected value, the movable contact of potentiometer P is simply moved to increase the electric field applied across sensor S if the preselected temperature is to be a higher value, or to decrease the electric field if a lower trip or preselected control temperature is chosen. Optional diode D1 prevents a reversal of current flow through the bridge including sensor S1 in the event of a temperature overshoot.

It will be understood that the FIG. 10 apparatus is also useful as a thermostatic control if a sensor is employed which has a sharp decrease in resistance in the desired temperature range. In such event, the temperature at which the sharp resistance decreases occurs is adjusted by variation in the electric field so that the resistance of such sensor decreases at this trip temperature so that the voltage drop across S1 is sharply diminished and the SCR gate potential falls below that which would trigger it.

In view of the above it will be seen that the invention has several features which are unique, as follows:

(1) The process of fabrication by comminution or crushing as described affords a unique means of making sensors having great mechanical and thermal stability, and excellent connections between their sensing components and their terminals, said sensing components in uncrushed forms having heretofore been precluded from practical use.

(2) The means of fabrication using particulate crushed materials affords a means by which sensor structures can be produced having far greater uniformity of characteristics from point to point than would otherwise be possible.

(3) The temperature-resistivity characteristics of the sensors being variable under a variable applied electric field, makes them extremely useful to make thermostatic devices with few or no moving parts, other than possibly their comparatively simple control potentiometers, or the like.

(4) The process can be utilized (a) to change certain substances, such as lanthanum-doped $BaTiO_3$, which exhibit PTC characteristics in certain ranges and NTC characteristics in other ranges, into completely NTC materials, and (b) to more economically prepare any NTC materials for use as sensor elements.

(5) Any breakdown effect is not catastrophic, so that sensors employing such breakdown effects may be operated many times through the breakdown cycle, with no damage or substantial change in characteristics.

(6) The electrical resistivity of the swaged particulate sensing elements assumes closely the characteristics of a single crystal specimen, even though all the swaged particles are not bonded interatomically. Thus the magnitude of the resistivity can, further, be varied substantially during manufacture over a wide range by varying the amount of reduction in the swaging operation.

Figure 11:
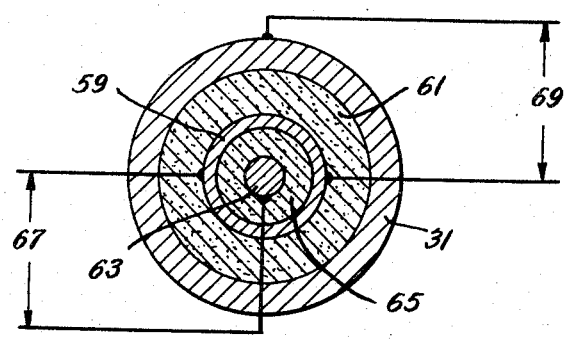
FIGS. 11–12 are diagrammatic cross sections of alternative forms of the invention.
Figure 12:
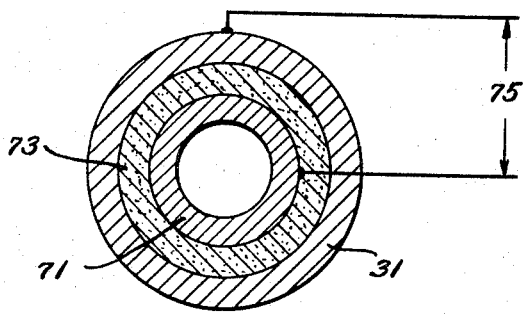

In FIGS. 11 and 12 are illustrated structures from which additional advantages flow. The method of manufacture of these forms, their materials and general operation will be clear from FIGS. 1–10 and the above descriptions.

In FIG. 11 is shown an arrangement for obtaining different signals in different channels. In this form the outer conductive swaged sleeve 31 contains an inner conductive swaged sleeve 59 with an intermediate compressed NTC particulate filling numbered 61 of one composition such as, for example, powdered alumina. Within the inner sleeve 59 is located a core rod or wire 63. Between it and the conductive sleeve 59 is an infilling of a second compressed composition such as powdered zirconium oxide 65. At 67 and 69 are shown different signal channels. In each the signal is different upon heating the sensor to its conductive state, because of the different reversible breakdown resistivities of the materials 61 and 65. Moreover, in this case the signals will occur at different temperatures because of the different breakdown temperatures of the materials 61 and 65.

It will be apparent that the FIG. 11 form of the invention may be made by inserting the members 59 and 63 into the outer member 31 and then infilling the particulate materials 61 and 65, after which a swaging operation is performed which is operative upon both members 31 and 59. Or, the core rod 63 may be inserted into the member 59 and the material 65 introduced therebetween, after which the member 59 is initially swaged so as to compress the material 65. Then the resulting assembly may be introduced into the member 31 and the material 61 introduced, after which the member 31 is swaged to compress the entire contents. It will also be understood that several spaced interior tubes such as 59 may be employed. The advantage of the invention as illustrated in FIG. 11 is that by using a number of cores or sheaths an appropriate sensor can perform several different functions at the same or different times.

In FIG. 12 is shown a form of the invention which is like that shown in FIG. 1, except that there is substituted for the rod or wire core 3 a tube. Thus in FIG. 12, numeral 31 indicates the swaged conductive outer member 31, and 71 illustrates the inner tube, with an infilling between the tube 71 and the sleeve 31 of particulate material 73 such as any of those above described. This provides one signal channel 75. The advantage of this form of the invention is that when the sensor is introduced into a suitable medium, some of it can be introduced into the tube 71, which increases the heat-transmitting surface, so that the temperature of the filling 73 responds more quickly to any change in temperature.

In view of the above, it will be seen that the several objects of the invention are achieved and other advantageous results attained.

As many changes could be made in the above methods, constructions and products without departing from the scope of the invention, it is intended that all matter contained in the above description or shown in the accompanying drawings shall be interpreted as illustrative and not in a limiting sense.

What is claimed is:

1. An electrical temperature sensor comprising a plurality of elongated electrically conductive, spaced core members, an elongated outer electrically conductive tubular member surrounding and spaced from the core members and essentially axially coextensive therewith, one of the core members is in the form of a tube and the other is of rod-like form therein, and compressed particulate material contained, throughout a substantial portion of the axial length of the members between the core members and between them and the outer conductive tubular member, the particulate material having two portions, the one of which is compressed between the tubular members and the other of which is compressed between the inner tubular core member and the rod-like core member therein, the material being characterized in that its resistivity decreases with increase in its temperature and a solid-phase, interatomic bond existing between the core members and the adjacent particulate material and between the tubular member and the adjacent particulate material.

2. An electrical temperature sensor comprising an electrically conductive outer tubular member surrounding an electrically conductive tubular core and essentially coextensive therewith along its axial length, and a mass of particulate NTC material forced into compression around the tubular core throughout a substantial portion of the axial length of the tubular member and core by the outer tubular member and a solid-phase, interatomic bond existing between the tubular member and the adjacent particulate material and between the tubular core and the adjacent particulate material, the material being characterized in that it has a repeatable breakdown resistivity.

3. An electrical temperature sensor comprising an electrically conductive rod-like core, a first electrically conductive tubular member spaced from and surrounding the core and essentially axially coextensive therewith, a second electrically conductive tubular member spaced from and surrounding the first tubular member and essentially axially coextensive therewith, a first mass of particulate NTC material between the rod-like core and the first tubular member throughout a substantial portion of the axial length of the rod-like core and the first tubular member, a second mass of particulate NTC material between the first and second tubular members throughout a substantial portion of the axial length of the tubular members, the particulate materials being forced into compression by at least one of the tubular members, the compression effecting conductivities in the respective materials which are not less than approximately 50% of the theoretical conductivity of the material from which particles have been formed, the materials being characterized in that they have repeatable breakdown resistivities and a solid-phase, interatomic bond existing between the rod-like core and the adjacent particulate material and between the tubular members and the adjacent particulate material.

4. An electrical temperature sensor comprising an inner tubular electrically conductive core, an outer electrically conductive tubular member spaced from and surrounding the core and essentially axially coextensive therewith, NTC particulate material between the member and the core throughout a substantial portion of the axial length of the tubular member and core and a solid-phase, interatomic bond existing between the core and the adjacent particulate material and between the tubular member and the adjacent particulate material.

5. An electrical temperature sensor, comprising an electrically conductive tubular outer electrode member surrounding an electrically conductive inner electrode tubular core member spaced from the outer electrode and essentially coextensive therewith along its axial length, a mass of particulate NTC material infilling the space between the tubular members throughout a substantial portion of the axial length, the particulate material being held in compression by the tubular members, and a solid-phase, interatomic bond existing between the tubular members and the adjacent particulate material, the compression of the mass effecting an electrical conductivity therein which is not less than approximately 50% of the theoretical conductivity of the material from which the particles have been formed, the material being characterized in that it has a repeatable breakdown resistivity at a certain temperature.

6. An NTC electrical sensor having a voltage-adjustable repeatable resistance-breakdown temperature, comprising a metallic tube forming an outer electrode and a plurality of metallic cores spaced from each other and from the metallic tube, the cores essentially coextensive with the tube along its axial length, one core of tubular form, another core of rod-like form and located within the tubular core, the cores forming several inner electrodes within the outer electrode whereby several pairs of electrodes are formed, a first compacted mass of particles located in the space between the outer electrode and the tubular core, a second compacted mass of particles located in the space between the tubular core and the rod-like core, the material composing the particles being selected from the group consisting of inorganic insulators, inorganic semiconductors, crystalline organic conductors and glass, the masses of particles surrounding the cores throughout a substantial portion of the axial length of the tube, thereby forming several voltage-adjustable conductive paths between the electrodes, a number less than all of the particles in the masses being solid-phase interatomically bonded to one another for strength and to provide a resistivity greater than that of the resistivity of an equal solid mass of material, particles lying adjacent to the inside of the outer electrode and the outsides of the inner core electrodes being solid-phase interatomically bonded thereto respectively to provide substantial holding strength between all the electrodes and the masses of particles.

7. A temperature sensor according to claim 6, wherein the shortest electrically conductive distances between at least some of several pairs of the electrodes are different from one another.

8. An NTC electrical sensor having a repeatable resistance-breakdown temperature, comprising a first metallic tube forming an outer electrode and a second metallic tube within the first tube and spaced therefrom forming an inner electrode or core, the electrodes being essentially coextensive along their axial length, a compacted mass of particles located in the space between the electrodes, the material composing the particles being selected from the group consisting of inorganic insulators, inorganic semiconductors, crystalline organic conductors and glass, the mass of particles surrounding the core throughout a substantial portion of the axial length of the tubes, a number less than all of the particles in the mass being solid-phase interatomically bonded to one another for strength and to provide a resistivity greater than that of the resistivity of an equal solid mass of material, particles lying adjacent to the inside of the outer tube and the outsides of the inner electrode being solid-phase interatomically bonded thereto respectively to provide substantial holding strength between the electrodes and the mass of particles.

9. A sensor according to claim 1 in which the two portions of particulate material are composed of different compositions to thereby facilitate the obtaining of different signals upon heating of the sensor.

References Cited
UNITED STATES PATENTS

| | | | |
|---|---|---|---|
| 2,782,290 | 2/1957 | Lannan et al. | 338—26 |
| 2,962,680 | 11/1960 | Sidaris | 338—9 |
| 3,017,592 | 1/1962 | Keller et al. | 338—28 |
| 3,064,222 | 11/1962 | Renier | 338—25 |
| 3,068,438 | 12/1962 | Rollins | 338—22 |
| 3,089,339 | 5/1963 | Rogers et al. | 73—362 |
| 3,109,227 | 11/1963 | Goodyear | 338—10 |

RICHARD M. WOOD, *Primary Examiner.*

WILLIAM D. BROOKS, *Assistant Examiner.*